(12) United States Patent
Hong et al.

(10) Patent No.: US 9,025,043 B2
(45) Date of Patent: May 5, 2015

(54) IMAGE SEGMENTATION FROM FOCUS VARIED IMAGES USING GRAPH CUTS

(75) Inventors: Li Hong, San Diego, CA (US); Mark Takita, Palo Alto, CA (US); W. Thomas Novak, Hillsborough, CA (US)

(73) Assignee: Nikon Corporation, Tokyo (JP)

( * ) Notice: Subject to any disclaimer, the term of this patent is extended or adjusted under 35 U.S.C. 154(b) by 351 days.

(21) Appl. No.: 13/119,541

(22) PCT Filed: Sep. 24, 2008

(86) PCT No.: PCT/US2008/077450
§ 371 (c)(1),
(2), (4) Date: Mar. 17, 2011

(87) PCT Pub. No.: WO2010/036240
PCT Pub. Date: Apr. 1, 2010

(65) Prior Publication Data
US 2011/0164152 A1    Jul. 7, 2011

(51) Int. Cl.
*H04N 5/228* (2006.01)
*H04N 5/262* (2006.01)
*G06K 9/34* (2006.01)
*G03B 13/18* (2006.01)

(52) U.S. Cl.
CPC ..................................... *G03B 13/18* (2013.01)

(58) Field of Classification Search
CPC ..... H04N 5/23254; H04N 5/225; G06K 9/34; G06K 9/03
USPC ................ 348/222.1, 239, 153, 159, 211.11, 348/208.1; 382/164, 171, 173–180, 382/225–230
See application file for complete search history.

(56) References Cited

U.S. PATENT DOCUMENTS

| 5,752,106 | A | 5/1998 | Yamano |
| 6,038,339 | A | 3/2000 | Hubel et al. |
| 6,661,907 | B2 * | 12/2003 | Ho et al. ....................... 382/118 |

(Continued)

FOREIGN PATENT DOCUMENTS

| WO | WO2010036240 A1 | 4/2010 |
| WO | WO2010036246 A1 | 4/2010 |

(Continued)

OTHER PUBLICATIONS

PCT International Search Report and Written Opinion for PCT/US2008/077450 (related to present application) dated Dec. 4, 2008, Nikon Corporation.

(Continued)

*Primary Examiner* — Pritham Prabhakher
(74) *Attorney, Agent, or Firm* — Roeder & Broder LLP (57) ABSTRACT

A system for providing an adjusted image of a scene includes an optical assembly, a capturing system coupled to the optical assembly, and a control system. The optical assembly is adjustable to alternatively be focused on a first focal area and a second focal area that is different than the first focal area. The capturing system captures a first frame of the scene when the optical assembly is focused at the first focal area, and a second frame of the scene when the optical assembly is focused at the second focal area. The first frame includes a plurality of first pixels and the second frame includes a plurality of second pixels. The control system analyzes the first frame and the second frame and utilizes graph cuts techniques to assign a depth label to at least a portion of the first frame.

26 Claims, 6 Drawing Sheets

(56) References Cited

U.S. PATENT DOCUMENTS

| | | |
|---|---|---|
| 6,711,293 B1 | 3/2004 | Lowe |
| 6,744,923 B1 | 6/2004 | Zabih et al. |
| 6,891,966 B2* | 5/2005 | Chen .............................. 382/145 |
| 6,973,212 B2 | 12/2005 | Boykov et al. |
| 7,019,776 B1 | 3/2006 | Lin |
| 7,430,339 B2* | 9/2008 | Rother et al. .................. 382/284 |
| 7,460,709 B2* | 12/2008 | Grady ............................ 382/180 |
| 7,720,371 B2 | 5/2010 | Hong et al. |
| 7,889,207 B2 | 2/2011 | Hong et al. |
| 7,925,089 B2* | 4/2011 | Rother et al. .................. 382/180 |
| 7,929,730 B2* | 4/2011 | Huang et al. ................... 382/103 |
| 8,009,886 B2* | 8/2011 | Li et al. .......................... 382/128 |
| 8,050,498 B2* | 11/2011 | Wilensky et al. .............. 382/173 |
| 8,103,068 B2* | 1/2012 | Zabih et al. .................... 382/128 |
| 2002/0060739 A1* | 5/2002 | Kitamura et al. .............. 348/222 |
| 2002/0113881 A1 | 8/2002 | Funston et al. |
| 2003/0011700 A1* | 1/2003 | Bean et al. ..................... 348/345 |
| 2003/0091225 A1* | 5/2003 | Chen ............................... 382/145 |
| 2003/0179911 A1* | 9/2003 | Ho et al. ......................... 382/118 |
| 2004/0008886 A1* | 1/2004 | Boykov ........................... 382/173 |
| 2004/0201766 A1 | 10/2004 | Funston et al. |
| 2004/0258305 A1 | 12/2004 | Burnham et al. |
| 2005/0078865 A1* | 4/2005 | Criminisi et al. .............. 382/154 |
| 2005/0163375 A1* | 7/2005 | Grady ............................ 382/180 |
| 2005/0169519 A1 | 8/2005 | Minakuti et al. |
| 2005/0271273 A1* | 12/2005 | Blake et al. .................... 382/173 |
| 2006/0039611 A1* | 2/2006 | Rother et al. .................. 382/199 |
| 2006/0147126 A1* | 7/2006 | Grady ............................ 382/274 |
| 2006/0221211 A1* | 10/2006 | Kondo et al. ................... 348/239 |
| 2006/0291721 A1* | 12/2006 | Torr et al. ...................... 382/173 |
| 2007/0031037 A1* | 2/2007 | Blake et al. .................... 382/173 |
| 2008/0025627 A1 | 1/2008 | Freeman et al. |
| 2008/0080775 A1* | 4/2008 | Zabih et al. .................... 382/226 |
| 2008/0175508 A1 | 7/2008 | Bando et al. |
| 2008/0175576 A1 | 7/2008 | Hong |
| 2008/0219549 A1 | 9/2008 | Dolan et al. |
| 2008/0316328 A1* | 12/2008 | Steinberg et al. ........... 348/222.1 |
| 2009/0273685 A1* | 11/2009 | Ciuc et al. ................... 348/222.1 |
| 2010/0086206 A1 | 4/2010 | Hong |
| 2010/0260431 A1 | 10/2010 | Tezaur |
| 2010/0266218 A1 | 10/2010 | Tezaur |
| 2010/0272356 A1 | 10/2010 | Hong |
| 2010/0316305 A1 | 12/2010 | Hong |
| 2011/0019909 A1 | 1/2011 | Farid et al. |
| 2011/0019932 A1 | 1/2011 | Hong |

FOREIGN PATENT DOCUMENTS

| | | |
|---|---|---|
| WO | WO2010036247 A1 | 4/2010 |
| WO | WO2010036248 A1 | 4/2010 |
| WO | WO2010036249 A1 | 4/2010 |
| WO | WO2010036250 A1 | 4/2010 |
| WO | WO2010036251 A1 | 4/2010 |

OTHER PUBLICATIONS

Murali Subbarao, Tae Choi, Arman Nikzad, "Focusing Techniques", Tech. Report Sep. 4, 1992, Dept. of Electrical Engineering, State Univ. of NY at Stony Brook, NY 11794-2350.

Agarwala et al., "Interactive digital photomontage", pp. 1-9, Proceedings of ACM SIGGRAPH 2004, http://grail.cs.washington.edu/projects/photomontage.

Li Hong and George Chen,"Segment-based Stereo Matching Using Graph Cuts",0-7695-2158-4/04 (C) 2004 IEEE, Proceedings of IEEE computer vision and pattern recognition 2004.

Milan Mosny et al., Multispectral color constancy: real image tests, School of Computing Science, Simon Fraser University, Burnaby, BC, Canada V5A 1S6, Human Vision and Electronic Imaging XII, SPIE vol. 6492, Jan. 2007, San Jose, CA (Copyright SPIE 2007).

M. Bertero and P. Boccacci, A Simple Method for the Reduction of Boundary Effects in the Richardson-Lucy Approach to Image Deconvolution, Mar. 17, 2005, Astronomy and Astrophysics manuscript No. aa2717-05, DISI, University of Genova, Genova Italy.

David S.C. Biggs and M. Andrews, Acceleration of Iterative Image Restoration Algorithms, Mar. 10, 1997, vol. 36, No. 8 pp. 1766-1775, Applied Optics, Optical Society of America, US.

Robert J. Hanisch et al., Denconvolution of Hubble Space Telescope Images and Spectra, Space Telescope Science Institute, Baltimore, MD, 1997, Chapter 10, pp. 310-361, Deconvolution of Images and Spectra Second Edition, Acadamic Press, Space Telescope Science Institute, Baltimore, Maryland, US.

L.B. Lucy, An Iterative Technique for the Rectification of Observed Images, The Astronomical Journal, 1974, vol. 79: pp. 745-754, University of Chicago, US.

W.H. Richardson, Bayesian-based Iterative Method of Image Restoration, J. Opt. Soc. Am., 1972, vol. 62, pp. 55-59, NW Washington, DC, US.

Advance E-mail PCT Notification Concerning Transmittal of Preliminary Report on Patentability, along with Written Opinion dated Dec. 4, 2008 for PCT/US2008/077450 (related to the present application), publication date Apr. 7, 2011, Nikon Corporation.

\* cited by examiner

IMAGE SEGMENTATION FROM FOCUS VARIED IMAGES USING GRAPH CUTS

BACKGROUND

Cameras are commonly used to capture an image of a scene. Some scenes often contain multiple objects which are located at different distances from the camera. For example, a scene may include one or more primary object(s) that are the primary focal point and are located in the foreground, and one or more objects that are in the background. Unfortunately, most inexpensive point and shoot cameras use a relatively inexpensive lens. As a result thereof, for a typical captured image all of the objects in the captured image have approximately the same level of focal sharpness even though the objects are at different distances from the camera.

SUMMARY

The present invention is directed to a system for providing an adjusted image of a scene. The system includes an optical assembly, a capturing system coupled to the optical assembly, and a control system. The optical assembly is adjustable to alternatively be focused on a first focal area and a second focal area that is different than the first focal area. The capturing system captures a first frame of the scene when the optical assembly is focused at the first focal area, and a second frame of the scene when the optical assembly is focused at the second focal area. The first frame includes a plurality of first pixels and the second frame includes a plurality of second pixels. In certain embodiments, the control system analyzes the first frame and the second frame and utilizes graph cuts techniques to assign a depth label to the first frame.

The term "depth layer" as used herein shall mean the relative depth of the scene to the focal plane.

In one embodiment, the control system can assign the depth label to the first pixels. For example, the scene can include one or more foreground objects and one or more background objects, and the control system can assign the depth label of either (i) a background pixel to first pixels that capture a portion of one of the background objects, or (ii) a foreground pixel to first pixels that capture a portion of one of the foreground objects. Stated in another fashion, the control system can determine which first pixels have captured a portion of the foreground objects and which first pixels have captured a portion of the background objects. This information can be used to guide the synthesis of the adjusted image. For example, during the creation of the adjusted image, the foreground pixels can be processed in a first fashion and the background pixels can be processed in a second fashion that is different than the first fashion. More specifically, artificial blurring can be added to the background pixels and not added to the foreground pixels. As a result thereof, the foreground pixels are visually emphasized in the adjusted image.

In one embodiment, the control system uses an energy cost system to analyze the pixel information from the first frame and the second frame. The energy cost system includes (i) a data cost that summarizes the blurness degree (local intensity variation, local contrast, etc) for each first pixel of the first frame via assumed depth labels (foreground or background), and (ii) a smoothness cost that measures the depth label smoothness of each first pixel of the first frame to its neighbors. Subsequently, graph cuts techniques are used to solve the energy cost system to obtain a depth label (foreground or background) for each first pixel of the first frame. The depth label assignment provided via graph cuts approximates the minimum energy cost of the energy system.

In another embodiment, the control system divides the first frame into a plurality of first image segments, and assigns a depth label to the first image segments. In this embodiment, each first image segment is a region of the first image that is substantially homogeneous in color. Moreover, the control system can use an energy cost system to analyze the plurality of first image segments of the first frame. The energy cost system can include (i) a data cost that summarizes the blurness degree (local intensity variation, local contrast, etc.) for each first image segment via assumed depth labels (foreground or background), and (ii) a smoothness cost that measures the depth label smoothness of each first image segment relative to its neighbors. Subsequently, graph cuts techniques are used to solve the energy cost system to obtain a depth label (foreground or background) for each first image segment.

The present invention is also directed to one or more methods for providing an adjusted image of the scene and one or more methods for determining the depth order of multiple objects in the scene.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
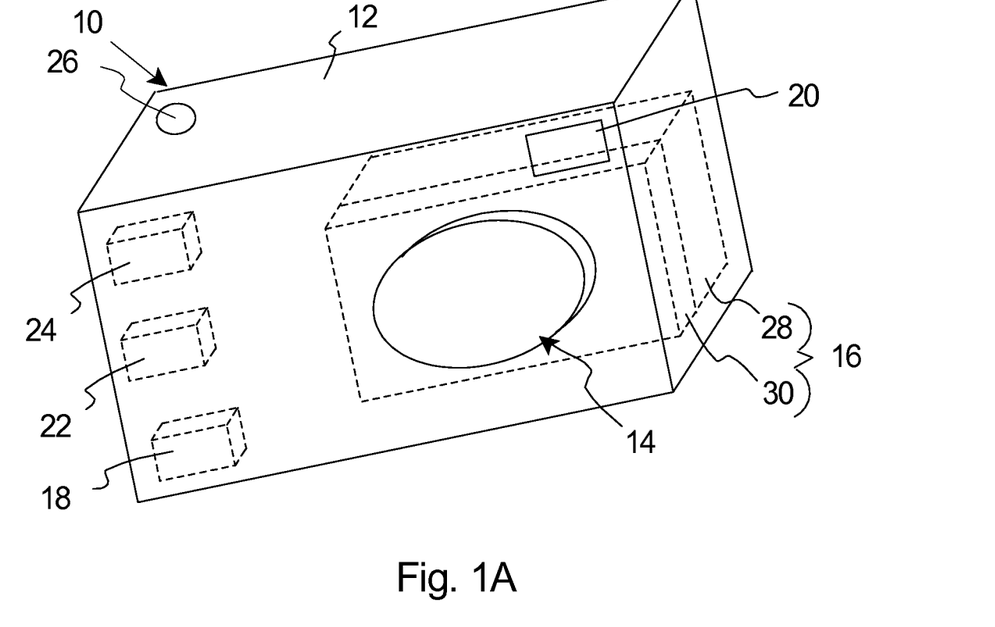
FIG. 1A is a simplified front perspective view of an image apparatus having features of the present invention.
Figure 1B:
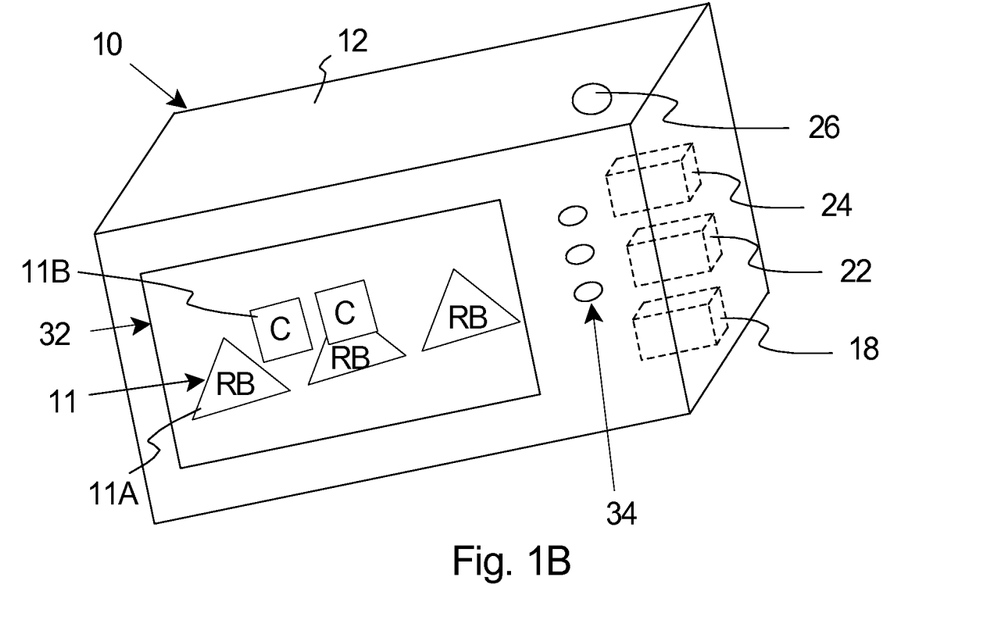
FIG. 1B is a simplified rear perspective view of the image apparatus of FIG. 1A.
Figure 2A:
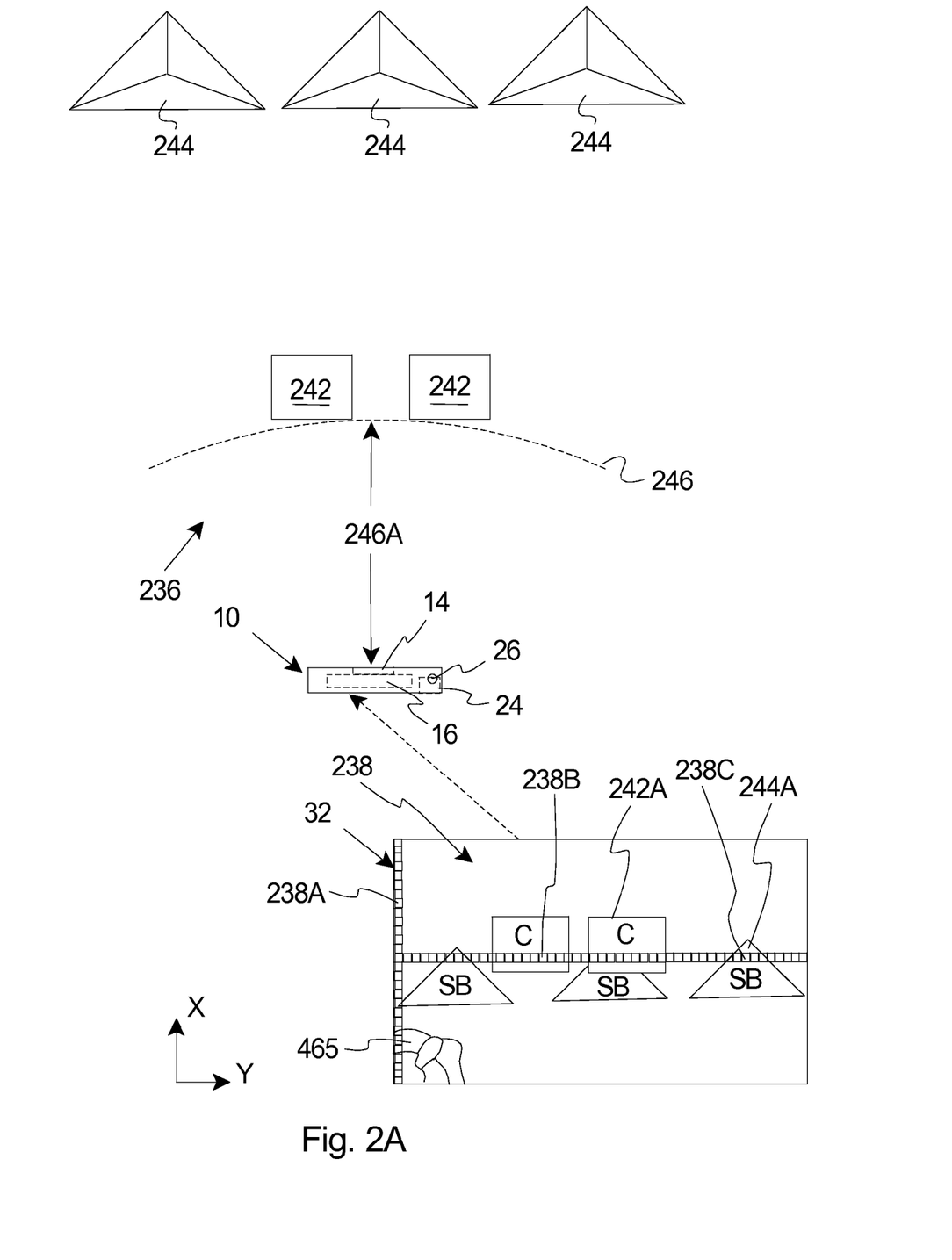
FIGS. 2A and 2B illustrate the scene and the image apparatus capturing two different frames.
Figure 2B:
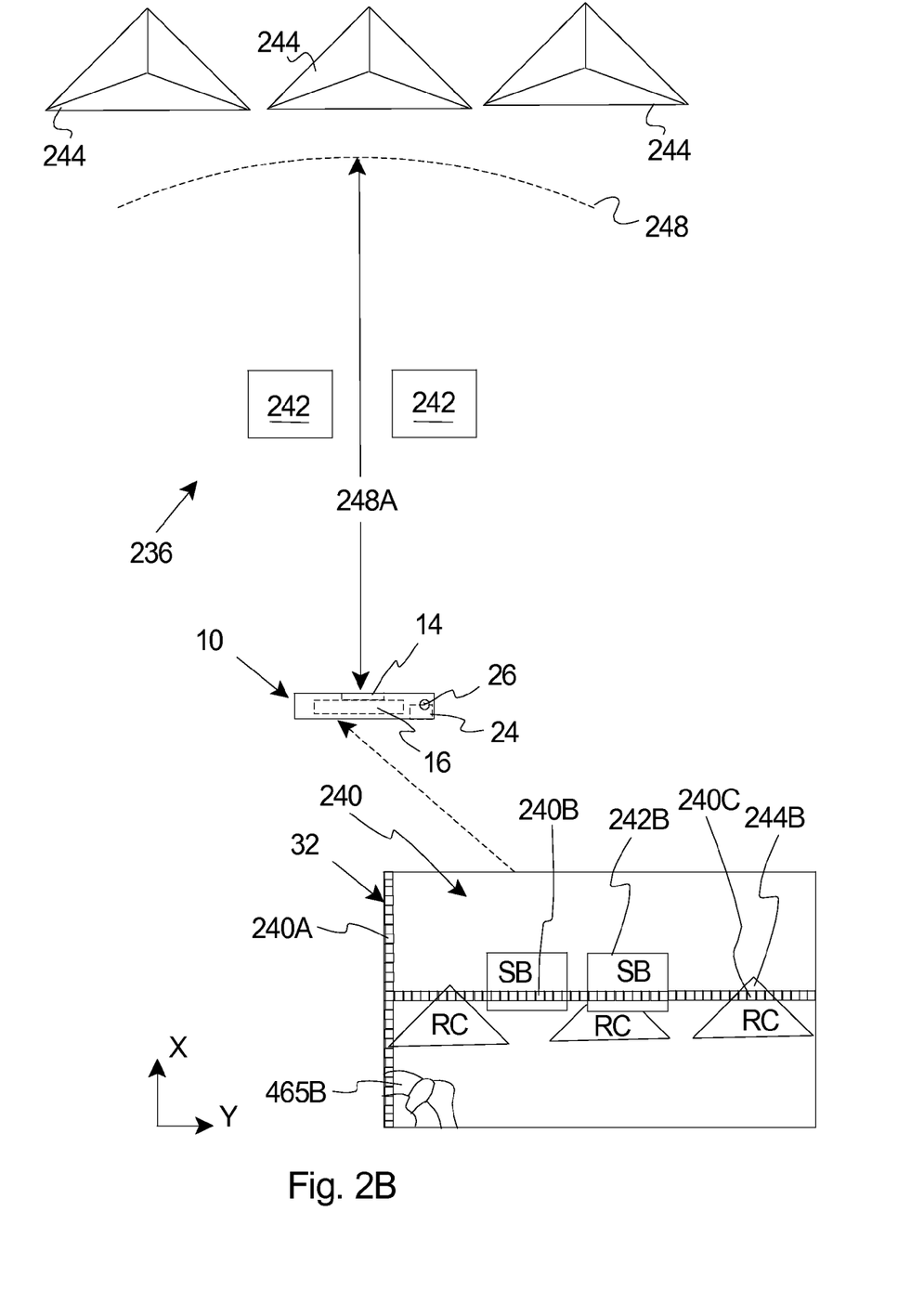

FIGS. 1A and 1B are simplified perspective views of one non-exclusive embodiment of an image apparatus 10 (also sometimes referred to as a "system") that is useful for providing an adjusted image 11 of a scene 236 (illustrated in FIGS. 2A and 2B). In this embodiment, the image apparatus 10 is a digital camera that includes an apparatus frame 12, an optical assembly 14, a capturing system 16 (illustrated as a box in phantom in FIG. 1A), a power source 18 (illustrated as a box in phantom), an illumination system 20, a storage assembly 22 (illustrated as a box in phantom), and a control system 24 (illustrated as a box in phantom). The design of these components can be varied to suit the design requirements and type of image apparatus 10. Further, the image apparatus 10 could be designed without one or more of these components. For example, the image apparatus 10 could be designed without the illumination system 20.

As an overview, in certain embodiments, the image apparatus 10 captures multiple frames of the same scene 236 at different adjustments of the optical assembly 22 in rapid succession. The multiple frames are analyzed using graph cuts to determine which pixels captured background objects and which pixels captured foreground objects in the scene 236. This information can be used to create special effects in and guide the synthesis of the adjusted image 11. For example, during the creation of the adjusted image 11, artificial blurring can be added to one or more captured background objects 11A in the adjusted image 11. As a result thereof, the one or more captured background objects 11A are deemphasized (represented as "RB's" because these objects are really blurred).

This emphasizes the one or more captured foreground objects 11B (represented as "C's" because these objects are clear) in the adjusted image 11.

The apparatus frame 12 is rigid and supports at least some of the other components of the image apparatus 10. In one embodiment, the apparatus frame 12 defines a cavity that receives and retains at least a portion of the capturing system 16, the power source 18, the illumination system 20, the storage assembly 22, and the control system 24. Further, the optical assembly 14 is fixedly secured to the apparatus frame 12.

The image apparatus 10 can include an aperture (not shown) and a shutter mechanism (not shown) that work together to control the amount of light that reaches the capturing system 16. The shutter mechanism can include a pair of blinds that work in conjunction with each other to allow the light to be focused on the capturing system 16 for a certain amount of time. Alternatively, for example, the shutter mechanism can be all electronic and contain no moving parts. For example, an electronic capturing system can have a capture time controlled electronically to emulate the functionality of the blinds. The time in which the shutter mechanism allows light to be focused on the capturing system 16 is commonly referred to as the capture time or the exposure time. The shutter mechanism is activated by a shutter button 26.

The optical assembly 14 can include a single lens or a combination of lenses that work in conjunction with each other to focus light onto the capturing system 16. With this design, the optical assembly 14 can be adjusted to focus on or in-between one or more of the objects in the scene 236.

In one embodiment, the imaging apparatus 10 includes an autofocus assembly (not shown) including one or more lens movers that move one or more lenses of the optical assembly 14 in or out to focus the light on the capturing system 16. For example, the autofocus assembly can be an active or passive type system.

The capturing system 16 captures a frame during the exposure time. The design of the capturing system 16 can vary according to the type of image apparatus 10. For a digital type camera, the capturing system 16 can include an image sensor 28 (illustrated in phantom), and a filter assembly 30 (illustrated in phantom) e.g. a Bayer filter.

The image sensor 28 receives the light that passes through the aperture and converts the light into electricity. One non-exclusive example of an image sensor 28 for digital cameras is known as a charge coupled device ("CCD"). An alternative image sensor 28 that may be employed in digital cameras uses complementary metal oxide semiconductor ("CMOS") technology. Each of these image sensors 28 includes a plurality of pixels.

The power source 18 provides electrical power to the electrical components of the image apparatus 10. For example, the power source 18 can include one or more batteries.

The illumination system 20 can provide a flash of light that can be used to illuminate at least a portion of the scene.

The storage assembly 22 stores the various captured frames and/or the adjusted images 11. The storage assembly 22 can be fixedly or removably coupled to the apparatus frame 12. Non-exclusive examples of suitable storage assemblies 22 include flash memory, a floppy disk, a hard disk, or a writeable CD or DVD.

The control system 24 is electrically connected to and controls the operation of the electrical components of the image apparatus 10. For example, the control system 24 is electrically connected to the optical assembly 22 and controls the operation of the optical assembly 22 to precisely control the focusing of the image apparatus 10 for the capturing of the multiple frames. Further, the control system 24 processes the multiple frames to provide the adjusted image 11. In certain embodiments, the control system 24 uses an algorithm that analyzes multiple frames of the same scene 236 to provide the adjusted image 11 of the scene 236 in which one or more primary object(s) of the scene 236 are emphasized, and one or more background object(s) of the scene 236 are deemphasized.

The control system 24 can include one or more processors and circuits and the control system 24 can be programmed to perform one or more of the functions described herein. In one embodiment, the control system 24 is coupled to the apparatus frame 12 and is positioned within the apparatus frame 12. The control system 24 is discussed in more detail below. Alternatively, an additional control system (not shown in FIGS. 1A and 1B) can be used to perform one or more of the functions described herein.

Additionally, the image apparatus 10 can include an image display 32 that displays the adjusted image 11. The image display 32 can also display other information such as the time of day, and the date. Moreover, the image apparatus 10 can include one or more control switches 34 electrically connected to the control system 24 that allows the user to control the functions of the image apparatus 10. For example, one or more of the control switches 34 can be used to selectively activate and deactivate the capturing of multiple images and the image special effects described herein.

FIG. 2A is an illustration of the scene 236, the image apparatus 10, and a first frame 238 (sometimes referred to as the "foreground frame") of the scene 236 captured by the image apparatus 10, and FIG. 2B is an illustration of the scene 236, the image apparatus 10, and a second frame 240 (sometimes referred to as the "background frame") of the scene 236 captured by the image apparatus 10. As provided herein, the image apparatus 10 captures the multiple frames 238, 240 of the same scene 236 at different adjustments of the optical assembly 14.

The type of scene 236 captured by the image apparatus 10 can vary. For example, the scene 236 can include features such as one or more people, animals, plants, items, mammals, objects, and/or environments. In certain embodiments, one or more of the features are the primary objects being captured, and/or one or more of the features are positioned in the background. In FIGS. 2A and 2B, the scene 236 includes two, first objects 242 that are the primary object of the scene 236, and three, second objects 244 that are in the background. Alternatively, for example, the scene 236 can include any number of first objects 242 or second objects 244. In FIGS. 2A and 2B, the first objects 242 are in the foreground and can be referred to as foreground objects, and the second objects 244 are in the background and can be referred to as background objects.

As provided herein, the frames 238, 240 can be used to identify the relative depth of the pixels in the first frame 238 and/or to generate the adjusted image 11 in which one or more captured foreground object(s) 11B of the scene 236 are emphasized and one or more captured background object(s) 11A of the scene 236 can be deemphasized.

FIGS. 2A and 2B also illustrate the optical assembly 14, the capturing system 16, the control system 24, and the shutter button 26 of the image apparatus 10. Additionally, FIGS. 2A and 2B illustrate the image display 32 positioned away from the rest of the image apparatus 10.

In FIG. 2A, the optical assembly 14 is adjusted to be focused approximately on the foreground objects 242. Stated in another fashion, the optical assembly 14 is focused at a first focal area 246 (illustrated as a dashed area) that is approximately at the front of at least some of the foreground objects 242 and that is at a first focus distance 246A from the optical assembly 14.

FIG. 2A also illustrates the first frame 238 on the image display 32 that is captured while the optical assembly 14 is focused at the first focal area 246. As a result thereof, for the first frame 238, captured first (foreground) object images 242A are clearly captured (represented as "C's"), and captured second (background) object images 244A are slightly blurred (represented as "SB's"). For a relatively inexpensive optical assembly 14, the difference in resolution between the captured object images 242A, 244A may not be very much.

In FIG. 2B, the optical assembly 14 is adjusted to be focused on a second focal area 248 (illustrated as a dashed area) that is intermediate the foreground objects 242 and the background objects 244, and that is at a second focus distance 248A from the image apparatus 10. FIG. 2B also illustrates the second frame 240 on the image display 32 that is captured while the optical assembly 14 is focused at the second focal area 248. For the second frame 240, captured first object images 242B are slightly blurred (represented as "SB's"), and captured background object images 244B are relatively clear (represented as "RC's").

In FIGS. 2A and 2B, the respective focal areas 246, 248 are illustrated as being generally arc shaped. Alternatively, the respective focal area 246, 248 can be generally planar shaped. Further, the areas of the frames 238, 240 not represented by squares or triangles is typically in the background.

As illustrated in FIGS. 2A and 2B, the focal areas 246, 248 are at different focus distances 246A, 248A away from the optical assembly 14. In this embodiment, the first focal area 246 is closest to the optical assembly 14, and the second focal area 248 is the farthest from the optical assembly 14. Alternatively, the focus distances 246A, 248A can be different than those illustrated in the figures. In certain embodiments, the control system 24 is able to determine the approximate values of the different focus distances 246A, 248A.

The amount of difference between the focus distances 246A, 248A can vary according to the design of the image apparatus 10 and/or the positioning of the objects 242, 244. In alternative, non-exclusive embodiments, the differences in the focus distances 246A, 248A can be approximately 1, 2, 5, 10, 15, 20, 30, 40, or 50 percent. Stated in another fashion, depending upon the scene, in alternative, non-exclusive embodiments, the differences in the focus distances 246A, 248A can be approximately 0.5, 1, 2, 3, 5, 10, 20, or 30 feet. However, other focus distances 246A, 248A can be utilized.

In one embodiment, the control system 24 controls the optical assembly 14 and the capturing system 16 to capture the two or more captured frames 238, 240 in rapid succession. In one non-exclusive example, when the shutter button 26 is partly depressed, the control system 24 controls the optical assembly 14 to focus the optical assembly 14 on or near the first objects 242 in FIG. 2A. Subsequently, when the shutter button 26 is completely depressed, the capturing system 16 captures the first frame 238. Next, the control system 24 controls the optical assembly 14 to focus the optical assembly 14 at the second focal area 248 and the capturing system 16 captures the second frame 240. With this design, the image apparatus 10 captures the first frame 238 with the primary objects 242 in focus and subsequently catches the second frame 240 by focusing backward.

Still alternatively, the second frame 240 can be captured prior to the capturing of the first frame 238 and/or before fully depressing the shutter button 26. For example, the second frame 240 can be a thru-image. Further, the frames 238, 240 can have different resolutions. Moreover, the control system 16 can be used to capture more than two frames in rapid succession.

The amount of time in which the image apparatus 10 captures the first and second frames 238, 240 can vary. In one embodiment, the frames 238, 240 are captured in rapid succession to reduce the influence of movement of the objects 242, 244. For example, in non-exclusive embodiments, the image apparatus 10 captures the multiple frames 238, 240 in less than approximately 0.1, 0.2, 0.4, 0.6, 0.8, 1, 1.5 or 2 seconds.

While the current invention is disclosed as the control system 24 controlling the optical assembly 14 to adjust the focal areas 246A, 248A, in certain embodiments, the optical assembly 14 can be manually adjusted to one or more of the focal areas 246, 248.

The first frame 238 is comprised of a plurality of first pixels 238A (only a few representative pixels are illustrated in FIG. 2A). Some of the first pixels 238A have captured a portion of one of first objects 242 and can be labeled as first object (foreground) pixels 238B, and some of the first pixels 238A have captured a portion of one of the second objects 244 and can be labeled as second object (background) pixels 238C.

Somewhat similarly, the second frame 240 is comprised of a plurality of second pixels 240A (only a few representative pixels are illustrated in FIG. 2B). Some of the second pixels 240A have captured a portion of one of first objects 242 and can be labeled as first object (foreground) pixels 240B, and some of the second pixels 240A have captured a portion of one of the second objects 244 and can be labeled as second object (background) pixels 240C.

Because of the focus of the optical assembly 14, the foreground objects 242 are best focused in the first frame 238, and the background objects 244 are best focused in the second frame 240. As a result thereof, each of the foreground pixels 238B of the first frame 238 should have a greater local contrast (or more sharp) than the corresponding foreground pixels 240B of the second frame 240. Further, each of the background pixels 238C of the first frame 238 should have a smaller local contrast (or less sharp) than the corresponding background pixels 240C of the second frame 240.

The control system 24 analyzes the first frame 238 and the second frame 240 and assigns a depth label to each of the first pixels 238A of the first frame 238. Stated in another fashion, the control system 24 analyzes the frames 238, 240 to determine which of the first pixels 238A should be labeled as foreground pixels 240B and which of the first pixels 238A should be labeled as background pixels 238C.

It should be noted that FIGS. 2A and 2B include a two-dimensional orientation system that illustrates an X axis, and a Y axis for each respective frame 238, 240. In this example, each of the first pixels 238A and each of the second pixels 240A can be labeled relative to this coordinate system. For example, the bottom left corner pixel can be indentified as (X1, Y1). Further, in FIG. 2A, first pixel (X15, Y18) is the foreground pixel that is identified by reference number 238B, and first pixel (X15, Y42) is the background pixel that is identified by reference number 238C. Similarly, in FIG. 2B, second pixel (X15, Y18) is the foreground pixel that is identified by reference number 240B, and second pixel (X15, Y42) is the background pixel that is identified by reference number 240C. Alternatively, the pixels can be identified in another fashion.

The method used to establish the depth label can vary pursuant to the teachings provided herein. In certain embodiments, the present invention builds up an energy system and subsequently uses graph cuts techniques to assign a depth label to each pixel. The present invention provides one or more methods to estimate which pixels are foreground objects and which pixels are background objects. This can be accomplished by changing the problem to a labeling problem in which each pixel is assigned as a foreground (F) pixel or a background (B) pixel.

Figure 3:
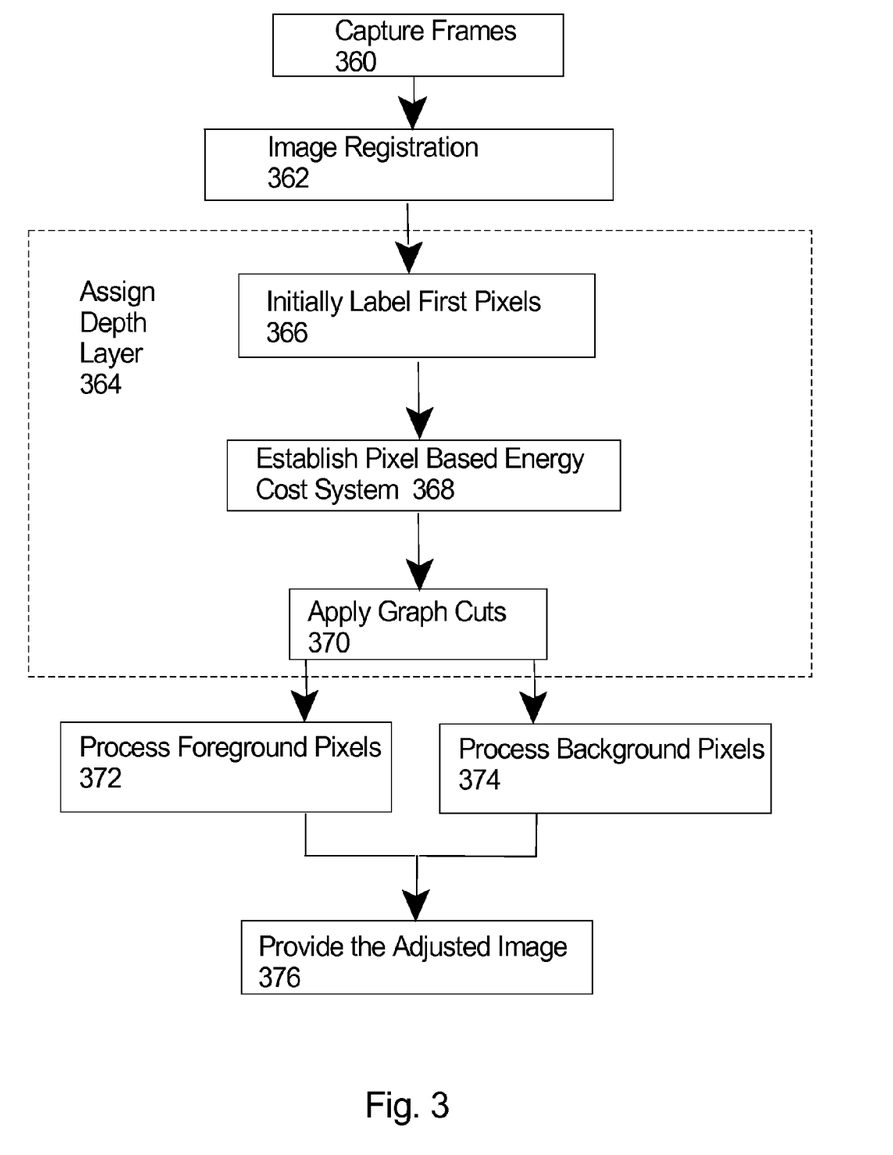
FIG. 3 is a flow chart that illustrates one method for generating an adjusted image.

FIG. 3 is a flow chart that illustrates one method that can be used to assign a depth label and subsequently provide the adjusted image 11. In this embodiment, the image apparatus first captures the frames in rapid succession 360. In the examples provided herein, the first frame is assumed to be focused on the foreground and the second frame is assumed to be focused on the background. The present example is described as using two frames to assign the depth labels. Alternatively, the processes disclosed herein can be easily extended to the case with more than two frames.

Subsequently, the control system performs image registration 362 to align the first frame with the second frame. Image registration methods are known in the art. One method of image registration 362 is a global hierarchical approach. Due to the successive capturing of the frames, the displacement of the objects between first frame and second frame should be small enough to allow a good image registration. However, for special situations with fast moving objects inside the scene, the alignment may require special handling.

In one simplified example, with no movement of the objects in the scene and the image apparatus, first pixel (Xn, Ym) in the first frame corresponds to second pixel (Xn, Ym) in the second frame. In another example, if there is movement of the image apparatus or objects, first pixel (Xn, Ym) in the first frame can correspond to second pixel (Xn+1, Ym−2) in the second frame.

Next, the control system uses one or more algorithms to analyze the frames and assign a depth label 364 to each of the first pixels.

First, some or all of the first pixels are initially labeled a foreground pixel and/or some or all the first pixels are initially labeled a background pixel 366. This can be accomplished in a number of ways. One method is to arbitrarily initially label each first pixel. Another method is to compute a blur degree around each pixel p in the first frame and compare it to a predetermined certain threshold. In this method, if the computed blur degree is higher than the threshold, then the pixel is initially labeled a background pixel (set L(p)=B); or if the computed blur degree value is lower than threshold, then the pixel is initially labeled a foreground pixel (assign L(p)=F). In another method, the blur degree around each pixel p is computed in the first frame and the second frame. This blur degree value at each pixel in the first frame can be denoted as B_1(p), and the blur degree value at each pixel in the second frame can be denoted as B_2(p). If B_1(p) is less than B_2(p), then pixel p is initially labeled a foreground pixel (L(p)=F). Otherwise, the pixel is initially labeled a background pixel (L(p)=B).

Subsequently, the control system can use a pixel based energy cost system 368 to determine if the arbitrary depth label assigned to each of the first pixels is correct. In this example, the energy cost system (E) contains two types of energy cost, namely (i) a data cost (E_data), and (ii) a smoothness cost (E_smooth). Thus, E=E_data +E_smooth. In this equation, (i) E_data is equal to the $$\sum_{p}$$

cost to assign label L(p), where p is any first pixel in the first frame; and (ii) E_smooth is equal to the $$\sum_{(p,q)}$$

cost to assign label L(p) and label L(q) to neighboring pixels p and q, where p and q are neighboring first pixels in the first frame.

If a first pixel is initially labeled a foreground pixel, (L(p)==F), the corresponding E_data cost with this labeling is the blur degree value computed around p in the first frame. Alternatively, if the first pixel is initially labeled a background pixel, (L(p)==B), the corresponding E_data cost with this labeling is the blur degree value computed around p in the second frame. The blur degree value can be computed in a small neighborhood via image local contrast, image local variance, or image local gradients, for example. A sharp pixel has a low blur degree value, while a blurred pixel has a high blur degree value.

For any pixel p, if p is a foreground pixel, and it was initially labeled a foreground pixel (L(p)=F), then the corresponding E_data cost for this pixel is the blur degree value computed around p in the first frame. This should have a small value. Alternatively, if that pixel was initially labeled a background pixel (L(p)=B), then the corresponding E_data cost for this pixel is the blur degree value computed around p in the second frame. Because the second frame was focused on background, the blur degree value around p is high (because p is a foreground pixel so it is blurry in the second frame). Therefore, if the initial label was incorrect, the E_data cost will go higher. This is one reason way the minimum energy function will approximate the correct labeling.

The smoothness cost (E_smooth) measures the foreground/background depth label smoothness between neighboring first pixels. If neighboring pixels have the same labeling assignment, L(p)=L(q), then the cost for (p,q) in E_smooth is zero. Alternatively, a positive penalty value for E_smooth can be assigned if neighboring pixels p, q are labeled differently L(p)≠L(q). The amount of the penalty depends on several issues, such as, how similar pixels p and q are in terms of intensity, blur degree value, etc. The more similar they are, the higher the penalty, while the less similar they are, the smaller the penalty. This is easy to understand as if two neighboring pixels differ quite significantly in intensity, or blur degree value, then we can not be sure that they should belong to the same object, or at the same depth, therefore the cost to assign different label (F or B) to them is low.

In one embodiment, the term neighboring pixels shall mean adjacent or nearby pixels. For example, neighboring pixels can mean the eight pixels that encircle the respective first pixel. In this example, for first pixel (Xn, Ym), the neighboring first pixels can include (Xn+1, Ym−1), (Xn+1, Ym), (Xn+1, Ym+1), (Xn, Ym−1), (Xn, Ym+1), (Xn−1, Ym−1), (Xn−1, Ym), and (Xn−1, Ym+1). Alternatively, neighboring pixels can mean four pixels that are adjacent to the respective first pixel. In this example, for first pixel (Xn, Ym), the neighboring first pixels can include (Xn+1,Ym), (Xn,Ym−1), (Xn,Ym+1), and (Xn−1,Ym). Typically, the larger the neighborhood considered can increase the amount of calculations being performed by the control system 24.

In this embodiment, the energy is built on all the pixels of the image. Next, in certain embodiments, the control system applies a graph cuts technique 370 to solve the energy equations to label each of the first pixels as foreground pixels or background pixels while approximating the minimum global cost. A discussion of certain graph cuts techniques is provided in U.S. Pat. No. 6,744,923 issued to Zabih et al. As far as permitted, the contents of U.S. Pat. No. 6,744,923 are incorporated herein by reference.

In one embodiment, energy minimization is used to assign a label to first pixels to find solutions that maintain depth smoothness for each object in the scene while preserving the edges of the objects. With graph cuts techniques, each first pixel is represented as a node on a graph. The nodes can be connected together with Edges to form a graph. The connectivity of the nodes depends on the selection of neighborhood size. (e.g., 4 or 8). In one embodiment, the nodes can be connected to neighboring nodes immediately to the right, to the left, above, and below. The strings (lines) connecting the nodes represent the relationship between the neighboring nodes. Alternatively, the nodes can be connected in another fashion than described above. For example, the nodes can additionally or alternatively be connected diagonally to neighboring nodes.

The goal of graph cuts is to find a labeling of the first pixels that approximates the minimum of the energy of the energy cost system. The algorithm can perform multiple iterations of labeling for the first pixels until the energy minimization is accomplished and each of the first pixels is labeled a foreground pixel or a background pixel.

In this embodiment, the depth analysis classified the first pixels as one of two types, namely a foreground pixel or a background pixel. Alternatively, the control system can classify the first pixels with more than two depth layers. It should also be noted that the foreground pixels, and the background pixels can also be described a first depth pixel, a second depth pixel, or some other label.

Next, the foreground pixels 372 and the background pixels 374 are processed to provide the adjusted image 376. In one embodiment, depending upon the classification of the first pixels, they are processed differently. For example, during the creation of the adjusted image, artificial blurring can be added to the background pixels using a low pass filter. As a result thereof, the foreground objects can be emphasized in the adjusted image.

Figure 4:
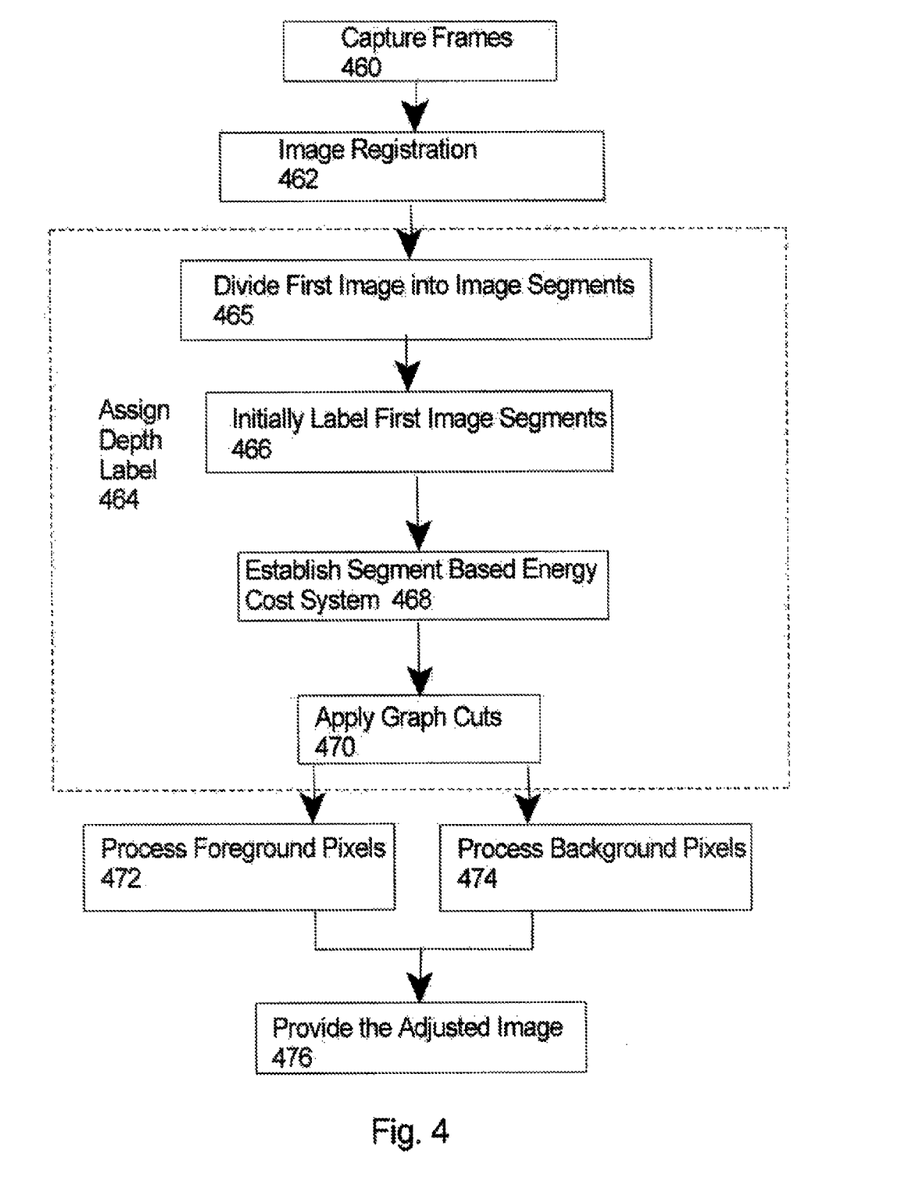
FIG. 4 is a flow chart that illustrates another method for generating the adjusted image.

FIG. 4 is a flow chart that illustrates another method that can be used to provide the adjusted image 11 that is somewhat similar to the method described above and illustrated in FIG. 3. In FIG. 4, the image apparatus again first captures the frames in rapid succession 460. Subsequently, the control system performs image registration 462 to align the first frame with the second frame.

Next, the control system uses one or more algorithms to analyze the frames and assign a depth label 464 to at least a portion of the first frame. In this embodiment, the control system analyzes the first frame and divides the first frame into a plurality of first image segments 465. Referring back to FIG. 2A, a representative number of first image segments 465 are illustrated in the left bottom of the first frame 238. For example, each of the first image segments 465 can be areas of the first frame 238 which have a substantially constant color (color homogenous regions). In this embodiment, areas of substantially constant color are assumed to be at the same depth label. Because, the frames are divided into a plurality of image segments 465, the overall computational complexity of the equations necessary to determine the depth label is reduced and the accuracy of the depth labels can be enhanced.

The size of each image segment 465 can vary according to the objects captured in the first frame 238. In alternative, non-exclusive embodiments, each image segment 465 can be comprised of approximately 50, 100, 500, 1000, 1500, 2000, or 2500 first pixels 238A. It should be noted that as the size of the image segments 465 is increased, the number of calculations required by the control system 24 is typically reduced. However, if the image segments 465 are too large, there is an increased chance that objects at different depth layers that are close in color can be grouped together as one image segment 465.

Next, referring back to FIG. 4, some or all of the first image segments can be initially, labeled a foreground image segment and/or some or all the first image segments can be initially, labeled a background image segment 466. This can be accomplished in a number of ways. One method is to arbitrarily initially label each first image segment. Another method is to compute a blur degree around each image segment in the first frame and compare it to a predetermined certain threshold. In this method, if the computed blur degree is higher than the threshold, then the image segment is initially labeled a background image segment; or if the computed blur degree value is lower than threshold, then the image segment is initially labeled a foreground pixel. In another method, the blur degree around each image segment is computed in the first frame and the second frame. This blur degree value at each image segment ("s") in the first frame can be denoted as $B\_1(s)$, and the blur degree value at each image segment in the second frame can be denoted as $B\_2(s)$. If $B\_1(s)$ is less than corresponding $B\_2(s)$, then the image segment is initially labeled a foreground image segment ($L(s)=F$). Otherwise, the image segment is initially labeled a background image segment ($L(s)=B$).

Subsequently, the control system uses a segment based energy cost system 468 to determine if the arbitrary depth label assigned to each of the first image segments is correct. In this example, the energy cost system (E) again contains two types of energy cost, namely (i) a data cost (E_data), and (ii) a smoothness cost (E_smooth). This results in an energy equation, E=E_data +E_smooth. In this equation, (i) E_data is equal to the $$\sum_{s}$$

cost to assign label L(s), where s is any image segment in the first frame; and (ii) E_smooth is equal to the $$\sum_{(s,t)}$$

cost to assign label L(s) and label L(t) to neighboring image segments s and t, where s and t are neighboring image segments in the first frame. It should be noted that (i) the phrase "energy cost system" can also be referred to as an "energy cost function"; (ii) the phrase "data cost" can also be referred to as a "data cost function"; and (iii) the phrase "smoothness cost" can also be referred to as a "smoothness cost function".

If image segment s is initially labeled a foreground image segment, (L(s)==F), the corresponding E_data cost with this labeling is the blur degree value computed around the image segment s in the first frame. Alternatively, if the image segment s is initially labeled a background image segment, (L(s)==B), the corresponding E_data cost with this labeling is the blur degree value computed around image segment s in the second frame. The blur degree value can be computed in a small neighborhood via image local contrast, image local variance, or image local gradients, for example. A sharp image segment has a low blur degree value, while a blurred image segment has a high blur degree value.

For any image segment s, if s is a foreground image segment, and it was initially labeled a foreground image segment (L(s)=F), then the corresponding E_data cost for this image segment is the blur degree value computed around image segment s in the first frame. This should have a small value. Alternatively, if that image segment was initially labeled a background image segment (L(s)=B), then the corresponding E_data cost for this image segment is the blur degree value computed around image segment s in the second frame. Because the second frame was focused on background, the blur degree value around image segment s is high (because s is a foreground image segment so it is blurry in the second frame). Therefore, if the initial label was incorrect, the E_data cost will go higher. This is one reason way the minimum energy function will approximate the correct labeling.

The smoothness cost (E_smooth) measures the foreground/background depth label smoothness between neighboring image segments. If neighboring image segments have the same labeling assignment, L(s)=L(t), then the cost for (s, t) in E_smooth is zero. Alternatively, a positive penalty value for E_smooth can be assigned if neighboring image segments s, t are labeled differently L(s)≠L(t). The amount of the penalty depends on several issues, such as, how similar image segments s and t are in terms of intensity, blur degree value, etc. The more similar they are, the higher the penalty, while the less similar they are, the smaller the penalty. This is easy to understand as if two neighboring image segments differ quite significantly in intensity, or blur degree value, then we can not be sure that they should belong to the same object, or at the same depth, therefore the cost to assign different label (F or B) to them is low.

Next, the graph cuts techniques can be applied to solve the energy cost system to label each of the first image segment as foreground image segments or background image segments. With graph cuts techniques, each first image segment is represented as a node on a graph. The nodes can be connected together with strings (lines) to form a net. In one embodiment, the nodes can be connected to neighboring nodes.

The goal of graph cuts again is to find a labeling of the first image segments that minimizes the energy of the energy cost system. The algorithm can perform multiple iterations of labeling for the first image segments until the energy minimization is accomplished and each of the first image segments is labeled a foreground image segment or a background image segment.

In this embodiment, the depth analysis classified the first image segments as one of two types, namely foreground or background. Alternatively, the control system can classify the first image segments with more than two depth layers.

Next, the foreground pixels of the foreground image segments and the background pixels of the background image segments are processed to provide the adjusted image 476. For example, during the creation of the adjusted image, artificial blurring can be added to the background pixels.

It should be noted that one or more of the steps illustrated in FIGS. 3 and 4 can be optional.

Figure 5:
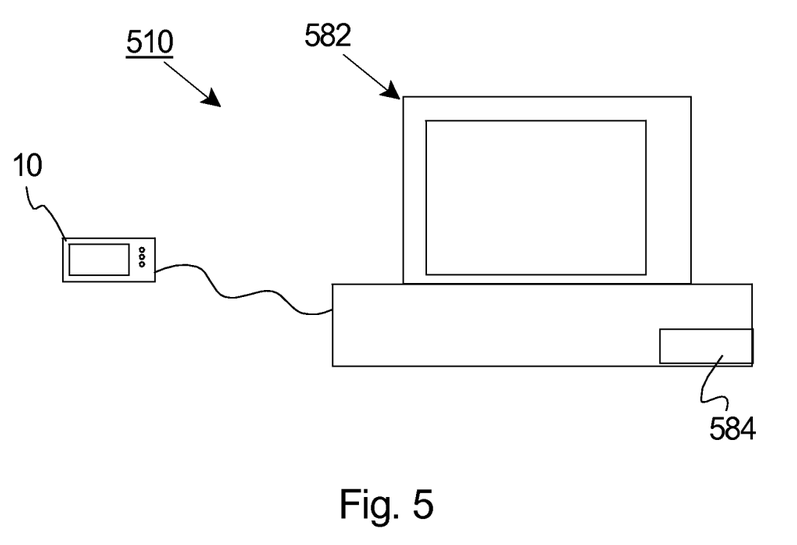
FIG. 5 is a simplified illustration of a system having features of the present invention.

FIG. 5 illustrates another embodiment of a system 510 having features of the present invention. In this embodiment, the system 580 includes a computer 582 that is electrically connected to the image apparatus 10. Further, in this embodiment, information from the image apparatus 10 can be transferred to the computer, and one or more steps described in FIGS. 3 and 4 can be performed by the computer 582. With this design, a control system 584 of the computer 582 can produce the adjusted image (not shown in FIG. 5) with the one or more of the frames using the methods described above.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A system for providing an adjusted image of a scene, the scene including a foreground object and a background object, the system comprising:
    an optical assembly that is adjustable to alternatively be focused on a first focal area and a second focal area that is different than the first focal area;
    a capturing system coupled to the optical assembly, the capturing system capturing a first frame of the scene when the optical assembly is focused at the first focal area, and subsequently capturing a second frame of the scene when the optical assembly is focused at the second focal area; and
    a control system that analyzes at least one of the frames and divides the first frame into a plurality of first image segments, each first image segment being substantially homogeneous in color and including a plurality of pixels, the control system analyzes the first image segments using a segment based energy cost function and the first frame and the second frame, and the control system uses graph cut techniques to solve the energy cost function to determine that one of the first image segments corresponds to one of a portion of the foreground object and a portion of the background object.

2. The system of claim 1 wherein the control system processes the first image segments that are determined to correspond to a portion of the foreground object in a first fashion, and the control system processes the first image segments that are determined to correspond to a portion of the background object in a second fashion.

3. The system of claim 1 wherein the control system utilizes graph cut techniques to assign a depth label of either a background image segment or a foreground image segment to a plurality of the first image segments.

4. The system of claim 3 wherein the control system processes the first image segments that are labeled as foreground image segments in a first fashion, and processes the first image segments that are labeled as background image segments in a second fashion that is different than the first fashion.

5. The system of claim 4 wherein the control system adds artificial blurring to the first image segments labeled as background image segments.

6. The system of claim 1, wherein the energy cost function includes (i) data cost function that assesses a cost to assign a label of a foreground image segment or a background image segment to at least one of the first image segments, and (ii) a smoothness cost function that compares a label of at least one first image segment with a label of its neighbors.

7. The system of claim 6 wherein graph cuts techniques are used by the control system to solve the energy cost function in a way that approximates a minimum global cost for the energy cost function.

8. A method for providing an adjusted image of a scene, the scene including a foreground object and a background object, the method comprising the steps of:
- alternatively focusing an optical assembly on a first focal area and a second focal area that is different than the first focal area;
- capturing a first frame of the scene when the optical assembly is focused at the first focal area with a capturing system;
- capturing a second frame of the scene after the first frame when the optical assembly is focused at the second focal area with the capturing system;
- dividing the first frame into a plurality of first image segments with a control system that includes a processor, each first image segment being substantially homogeneous in color and including a plurality of pixels;
- using a segment based energy cost function to analyze the first image segments with the control system using the first frame and the second frame; and
- solving the segment based energy cost function using graph cut techniques with the control system to determine that one of the first image segments corresponds to one of a portion of the foreground object and a portion of the background object.

9. The method of claim 8 further comprising the step of assigning an initial depth label of either a background image segment or a foreground image segment to a plurality of the first image segments performed prior to the step of using the segment based energy cost function.

10. The method of claim 8 wherein the segment based energy cost function includes (i) a data cost function that assesses a cost to assign a label of a foreground image segment or a background image segment to at least one of the first image segments, and (ii) a smoothness cost function that compares a label of at least one first image segment with a label of its neighbors.

11. A method for identifying a foreground object and a background object in a scene, the method comprising the steps of:
- providing a capturing system;
- focusing light onto the capturing system with an optical assembly;
- alternatively focusing the optical assembly on a first focal area and a second focal area that is different than the first focal area;
- capturing a first frame of the scene when the optical assembly is focused at the first focal area with the capturing system;
- capturing a second frame of the scene after the first frame when the optical assembly is focused at the second focal area with the capturing system;
- dividing the first frame into a plurality of image segments with a control system that includes a processor based on color, each image segment being substantially homogeneous in color and including a plurality of adjacent pixels;
- assigning an initial depth label to each of the plurality of image segments with the control system, the initial depth label being either a foreground image segment or a background image segment; and
- using a segment based energy cost function on the image segments with the control system using the first frame and the second frame to determine if the initial depth label assigned to each of the plurality of the image segments is correct.

12. The method of claim 11 wherein the step of using the segment based energy cost function includes utilizing graph cut techniques to solve the segment based energy cost function to find a labeling of the image segments that minimizes an energy of the segment based energy cost function and determine if the initial depth label assigned to each of the image segments is correct.

13. The method of claim 11 wherein the step of using the segment based energy cost function includes utilizing graph cut techniques to solve the segment based energy cost function to find a labeling of the image segments in a way that approximates a minimum global cost to the segment based energy cost function.

14. The method of claim 11 wherein the segment based energy cost function includes (i) a data cost function that assesses a cost to assign the initial depth label of a foreground image segment or a background image segment to at least one of the image segments, and (ii) a smoothness cost function that compares an initial depth label of at least one image segment with a depth label of its neighbors.

15. The method of claim 11 further comprising a step of performing image registration to align the first frame with the second frame using the control system.

16. The method of claim 11 wherein the step of assigning the initial depth label is an arbitrary assignment of the initial depth label to each of the image segments.

17. The method of claim 11 wherein the step of assigning the initial depth label includes the step of computing a blur degree around each of the image segments with the control system, comparing the blur degree to a predetermined threshold, and for each image segment assigning the initial depth label of the background image segment if the computed blur degree is higher than the predetermined threshold, and assigning the initial depth label of the foreground image segment if the computed blur degree is lower than the predetermined threshold.

18. The method of claim 11 wherein the step of assigning the initial depth label includes (i) a step of computing a blur degree of each image segment using the control system for the first frame and the second frame, and (ii) for each image segment, comparing the blur degree of the first frame to the blur degree of the second frame to assign the initial depth label.

19. A method for identifying a foreground object and a background object in a scene, the method comprising the steps of:
- providing a first frame and a second frame of the scene, the first frame being different from the second frame;
- dividing the first frame into a plurality of image segments based on color with a control system that includes a processor so that each image segment is substantially homogeneous in color and includes a plurality of adjacent pixels;
- assigning an initial depth label to each of the image segments with the control system, the initial depth label being either a foreground image segment or a background image segment; and
- using a segment based energy cost function on the image segments with the control system using the first frame and the second frame to determine if the initial depth label assigned to each of the image segments is correct.

20. The method of claim 19 wherein the step of using the segment based energy cost function includes utilizing graph cut techniques to solve the segment based energy cost function to find a labeling of the image segments that minimizes an energy of the segment based energy cost function and determine if the initial depth label assigned to each of the image segments is correct.

21. The method of claim 19 wherein the step of using the segment based energy cost function includes utilizing graph cut techniques to solve the segment based energy cost function to find a labeling of the image segments in a way that approximates a minimum global cost to the segment based energy cost function.

22. The method of claim 19 wherein the segment based energy cost function includes (i) a data cost function that assesses a cost to assign the initial depth label of a foreground image segment or a background image segment to at least one of the image segments, and (ii) a smoothness cost function that compares an initial depth label of at least one image segment with a depth label of its neighbors.

23. The method of claim 19 further comprising a step of performing image registration to align the first frame with the second frame using the control system.

24. The method of claim 19 wherein the step of assigning the initial depth label is an arbitrary assignment of the initial depth label to each of the image segments.

25. The method of claim 19 wherein the step of assigning the initial depth label includes the step of computing a blur degree around each of the image segments with the control system, comparing the blur degree to a predetermined threshold, and for each image segment assigning the initial depth label of the background image segment if the computed blur degree is higher than the predetermined threshold, and assigning the initial depth label of the foreground image segment if the computed blur degree is lower than the predetermined threshold.

26. The method of claim 19 wherein the step of assigning the initial depth label includes (i) a step of computing a blur degree of each image segment using the control system for the first frame and the second frame, and (ii) for each image segment, comparing the blur degree of the first frame to the blur degree of the second frame to assign the initial depth label.

* * * * *